US006369180B1

(12) United States Patent
Shih et al.

(10) Patent No.: US 6,369,180 B1
(45) Date of Patent: *Apr. 9, 2002

(54) PROCESS FOR MAKING WATER SOLUBLE POLYVINYLCAPROLACTAM POLYMERS

(75) Inventors: Jenn S. Shih, Paramus; Donald I. Prettypaul, Englewood; John Mc Kittrick, Jersey City; David E. Graham, Long Valley, all of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/642,545

(22) Filed: Aug. 18, 2000

(51) Int. Cl.$^7$ .............................. C08J 26/08; C08J 26/10
(52) U.S. Cl. .................... 526/264; 526/258; 526/303.1; 526/307; 526/307.1; 526/307.3; 526/318.3; 526/328.5; 526/320
(58) Field of Search ................................ 526/264, 307, 526/307.3, 303.1, 318.3, 320, 328.5

(56) References Cited

U.S. PATENT DOCUMENTS

| 5,608,024 | A | * | 3/1997 | Shih | 526/264 |
| 5,626,836 | A | * | 5/1997 | Liu et al. | 427/47 |
| 5,739,195 | A | * | 4/1998 | Kroker et al. | 524/459 |
| 5,830,438 | A | * | 11/1998 | Dupuis | 424/45 |
| 6,193,961 | B1 | * | 2/2001 | Liu et al. | 424/70.12 |
| 6,225,429 | B1 | * | 5/2001 | Chuang et al. | 526/264 |

\* cited by examiner

*Primary Examiner*—David W. Wu
*Assistant Examiner*—Tanya Zalukaeva
(74) *Attorney, Agent, or Firm*—Walter Katz; William J. Davis; Marilyn J. Maue

(57) ABSTRACT

A process of making a homopolymer of vinyl caprolactam (VCL), and a copolymer with dimethylaminopropyl methacrylamide (DMAPMA), optionally including with one or more polymerizable monomers (X), in the composition range, by weight, VCL 99 to 30%, DMAPMA 1–70% and monomer X 0–30%, respectively, by suspension polymerization in an aqueous/alcoholic solvent medium, without requiring a protective colloid, which comprises charging vinyl caprolactam in an aqueous/alcoholic solvent mixture, wherein the weight ratio of alcohol to total monomers is ⅙ to 3, and if present, forming a solution of DMAPMA and optional monomers in water, feeding the solution into the VCL charge at a predetermined rate, periodically adding initiator to the reaction mixture, and polymerizing at about 40° to 130° C., and, if desired, neutralizing the product, to form a polymer product at about 5% to 40% solids, homogeneously dispersed in the solvent.

9 Claims, No Drawings

PROCESS FOR MAKING WATER SOLUBLE POLYVINYLCAPROLACTAM POLYMERS

RELATED PATENT APPLICATIONS

This application is based upon an invention by the same Assignee, ISP Investments Inc. as herein, U.S. Ser. No. 09/573,805, filed on May 18, 2000, entitled "COLOR INK-JET RECEPTIVE FILMS HAVING LONG TERM LIGHT STABILITY".

BACKGROUND OF THE INVENTION

1. Field of the Invention

This invention relates to a process for making water soluble vinyl caprolactam polymers, and, more particularly, to a homopolymer of vinyl caprolactam, and copolymers with dimethylaminopropyl methacrylamide, optionally with one or more polymerizable monomers, by suspension polymerization in an aqueous/alcoholic solvent medium, without requiring a protective colloid, which polymers are particularly suitable for use as a coatings for color-inkjet receptive films.

2. Description of the Prior Art

J. Kroker et al, in U.S. Pat. No. 5,739,195, described a process for preparing an aqueous solution of 10–60% polyvinyl caprolactam (PVCL) homopolymer at a temperature above its cloud point in the presence of 0.1–20% by weight based upon vinyl caprolactam (VCL) monomer of a water-soluble synthetic polymeric protective colloid. Aqueous polyvinyl caprolactam homopolymer made with a protective colloid present in the starting materials was homogeneous, whereas protective colloid free systems were inhomogeneous, which were not readily dilutable with water except stirring for a prolonged period of time. Addition of an emulsifier to the starting material also formed an appreciable portion of PVCL polymer remained attached to the stirrer element.

The advent of color inkjet printing has been instrumental in fueling the print-on-demand revolution and has also created a number of challenges. Often, the surface of the desired media does not possess the necessary properties for accepting the ink-jet ink. This results in long dry times and/or a poor ink-jet image. It has long been recognized that a surface treatment or media coating plays a critical role in the final print quality. Numerous media coatings are known in the art. They may contain any number of components and often consist of more than one layer. These ink-receptive coatings generally contain at least one hydrophilic polymer; often poly(vinylpyrrolidone) (PVP). PVP brings many benefits to properly formulated media coatings including rapid ink dry time, excellent print quality, highly resolved circular dots, and high, uniform optical density. Furthermore, copolymers of vinylpyrrolidone (VP) along with other suitable comonomers, such as dimethylaminoethyl methacrylate, acrylic acid, or vinyl acetate, have been used separately or in conjunction with PVP, to further optimize performance. Unfortunately, ink-jet images printed on VP-based formulations are prone to fading with exposure to light. Increasing demands for achievable ink-jet images has created a need for polymers with all the positive attributes of vinyl pyrrolidone and with improved light stability.

SUMMARY OF THE INVENTION

A process of making a homopolymer of vinyl caprolactam (VCL), and a copolymer with dimethylaminopropyl methacrylamide (DMAPMA), optionally including with one or more polymerizable monomers (X), in the composition range, by weight, VCL/DMAPMA/X, 99 to 30%, 1–70% and 0–30%, respectively, by suspension polymerization in an aqueous/alcoholic solvent medium, without requiring a protective colloid, which comprises charging vinyl caprolactam in an aqueous/alcoholic solvent mixture, wherein the weight ratio of alcohol to total monomers is 1/6 to 3, and if present, forming a solution of DMAPMA and optional monomers in water, feeding the solution into the VCL charge at a predetermined rate, periodically adding initiator to the reaction mixture, and polymerizing at about 40° to 130° C., and, if desired, neutralizing the product, to form a polymer product at about 5% to 40% solids.

DETAILED DESCRIPTION OF THE INVENTION

In accordance with the invention, the following are the General Reaction Conditions" for carrying out the suspension polymerization process herein without requiring a protective colloid.

General Reaction Conditions

Composition VCl/DMAPMA/X
VCl: 99 to 30 wt. %
DMAPMA: 1–70 wt. %
X: Any polymerizable monomer, 0–30 wt. %
Amount of Alcohol Solvent
Wt. ratio of alcohol/total monomers=1/6 to 3
Prefer: 0.8 to 1.2; methanol or ethanol
Feeding Time: DMAPMA:
1–6 hours; preferably 3–5 hours Feeding rate can be varied in order to get most homogeneous structure.
Polymerization Temperature:
40 to 130° C.; prefer 50 to 80° C.
Solids:
5 to 40%; prefer 10 to 20%
Neutralizer:
Organic acid: glycolic acid, citric acid, tataric acid, acetic acid
Inorganic acid: hydrochloric acid, nitric acid, sulfuric acid, phosphoric acid
Initiator:
Any free radical initiator
Prefer: t-butylperoxypivalate, t-amylperoxypivalate, didecanoyl peroxide, Vazo® 52, 64, 67
Amount of Initiators:
Wt. ratio of initiator/total monomer=0.1% to 10%
Prefer: 0.2% to 5%
Most prefer: 0.3% to 1.0%

The invention will now be described in more detail with reference to the following examples.

EXAMPLE 1

P(VCL/DMAPMA) 80/20 Wt. % (10% Solids)

Into a 2l, 4-necked resin kettle, fitted with a stainless steel anchor agitator, a nitrogen purge dip tube, an adapter and a reflux condenser, was added 144 g of N-vinylcaprolactam, 189 g of methanol and 97 g of water. The mixture was heated to 55° C. with a nitrogen purge throughout the run. Then 36 g DMAPMA with 424 g of water was added to a syringe pump. After purging the kettle with nitrogen for ½ hour, 0.3 g of initiator t-butylperoxy pivalate (Lupersol® 11) was added to the kettle. After 15 minutes, the water/DMAPMA mixture in the syringe pump was added to the kettle according to the feeding rate given below in Table 1 over a period of 4 hours. During the feeding, two portions of 0.3 g of Lupersol-11 were added at 1- and 2-hour intervals. After completing the feeding schedule, the reaction mixture was heated to 60° C. and an additional 0.15 g of Lupersol® 554 was added, followed an hour later by another 0.15 g shot after holding for ½ hour, 900 g of water was added at a rate of 600 ml/hr. The reaction product then was held at 60° C. for 4 hours, and 2 boosters of 0.08 g of Lupersol® 11 were added 2 hours apart. Then, 3 hours after the last booster addition, the reaction product was cooled to 35° C. and neutralized with 20.8 g of concentrated (37 wt. %) HCl solution.

TABLE 1

Feeding of DMAPMA/Water Mixture

| Time (min) | Feed rate (ml/hr) |
| --- | --- |
| 0–30 | 188 |
| 30–60 | 222 |
| 60–90 | 174 |
| 90–120 | 126 |
| 120–150 | 88 |
| 150–180 | 59 |
| 180–210 | 39 |
| 210-240 | 24 |

EXAMPLE 2

P(VCL/DMAPMA) 80/20 (20%)

Into a 2-l, 4-necked resin kettle, fitted with a stainless steel anchor agitator, a nitrogen purge dip tube, an adapter and a reflux condenser, added 144 g of N-vinylcaprolactam, 189 g of methanol and 97 g of water. The mixture was heated to 55° C. with a nitrogen purge throughout the run. Mix 36 g DMAPMA with 424 g of water and add to syringe pump. After purging nitrogen for ½ hour, add 0.3 g of initiator t-butylperoxy pivalate (Lupersol 11) to kettle. Wait 15 minutes; then start feeding the water/DMAPMA mixture according to the feeding rate in Table 1 over 4 hours. Two portions of 0.3 g of Lupersol 11 are added at 1-hour and 2-hour time period during feeding. After feeding, the reaction is heated to 60° C. and 0.15 g of Lupersol 554 is added. One hour later another 0.15 g of Lupersol 554 is added. The reaction was held at 60° C. for 4 hours. Then 2 boosters of 0.08 g of Lupersol 11 are added 2 hours apart. Wait 3 hours after the last booster, then cool down the reaction to 35° C. and neutralize with 20.8 g of concentrated (37%) HCl solution.

EXAMPLE 3

P(VCL/DMAPMA) 80/20 (10%)

Mix 36 g DMAPMA with 424 g of water. Into a 2-l, 4-necked resin kettle, fitted with a stainless steel anchor agitator, a nitrogen purge dip tube, an adapter and a reflux condenser, added 144 g of N-vinylcaprolactam, 14 g of N,N-dimethylaminopropyl methacrylamide (DMAPMA)/water solution, 189 g of methanol and 97 g of water. The remainder DMAPMA/water solution was added into syringe pump. The mixture was heated to 55° C. with a nitrogen purge throughout the run. After purging nitrogen for ½ hour, add 0.15 g of initiator t-butylperoxy pivalate (Lupersol 11) to kettle. Wait 15 minutes; then start feeding the water/DMAPMA mixture according to the feeding rate in Table 2 over 4 hours. Two portions of 0.15 g of Lupersol 11 are added at 1-hour and 2-hour time period during feeding. After feeding, the reaction is heated to 60° C. and 0.08 g of Lupersol 554 is added. One hour later another 0.08 g of Lupersol 554 is added. Wait ½ hour, then add 900 g Dl water at 600 ml/hr. The reaction is held at 60° C. for 4 hours. Then 2 boosters of 0.08 g of Lupersol 11 are added 2 hours apart. Wait 3 hours after the last booster, then cool down the reaction to 35° C. and neutralize with 20.8 g of concentrated (37%) HCl solution.

TABLE 2

Feed Rate of Water/DMAPMA mixture

| Time (min) | Feed rate (ml/hr) |
| --- | --- |
| 0–30 | 160 |
| 30–60 | 222 |
| 60–90 | 174 |
| 90–120 | 126 |
| 120–150 | 88 |
| 150–180 | 59 |
| 180–210 | 39 |
| 210–240 | 24 |

EXAMPLE 4

P(VCL/DMAPMA) 70/30

Into a 2-l, 4-necked resin kettle, fitted with a stainless steel anchor agitator, a nitrogen purge dip tube, an adapter and a reflux condenser, added 126 g of N-vinylcaprolactam, 189 g of methanol and 97 g of water. The mixture was heated to 55° C. with a nitrogen purge throughout the run. Mix 54 g DMAPMA with 424 g of water and add to syringe pump. After purging nitrogen for ½ hour, add 0.3 g of initiator t-butylperoxy pivalate (Lupersol 11) to kettle. Wait 15 minutes; then start feeding the water/DMAPMA mixture over 4 hours. Two portions of 0.3 g of Lupersol 11 are added at 1-hour and 2-hour time period during feeding. After feeding, the reaction is heated to 60° C. and 0.15 g of Lupersol 554 is added. One hour later another 0.15 g of Lupersol 554 is added. Wait ½% hour, then add 900 g Dl water at 600 ml/hr. The reaction was held at 60° C. for 4 hours. Then 2 boosters of 0.08 g of Lupersol 11 are added 2 hours apart. Wait 3 hours after the last booster, then cool down the reaction to 35° C. and neutralize with 30 g of concentrated (37%) HCl solution.

EXAMPLE 5

P(VCL/DMAPMA/LM) 80/20/10 (10%)

Mix 36 g DMAPMA, 18 g lauryl methacrylate with 42 g of water and 84 g of Dl water and the mixed solution was added into syringe pump. Into a 2-l, 4-neck resin kettle, fitted with a stainless steel anchor agitator, a nitrogen purge dip tube, an adapter and a reflux condenser, add 144 g of N-vinylcaprolactam, 96 g of methanol and 48 g of water. The mixture was heated to 60° C. and purged nitrogen throughout the experiment. After purging nitrogen for ½ hour, add 0.15 g of initiator t-butylperoxy pivalate (Lupersol 11) to kettle. Start feeding the DMAPMA solution from the syringe pump into the kettle over 4 hours. Two portions of 0.3 g of Lupersol 11 are added at 1-hour and 2-hour time period during feeding. After feeding, the solution is kept at 60° C. and 0.15 g of Lupersol 554 is added. One hour later, another 0.15 g of Lupersol 554 is added. The reaction was kept at 60° C. overnight. Then, 4 boosters of 0.08 g of Lupersol 11 are added 2 hours apart. Wait for 3 hours after the last booster, then cool down the reaction to 35° C. and neutralize with 20.8 g of concentrated (37%) HCL solution.

EXAMPLE 6

P(VCL/DMAPMA/SM) 80/20/10 (10%)

Mix 36 g DMAPMA, 18 g stearyl methacrylate with 42 g of water and 84 g of Dl water and the mixed solution was added into syringe pump. Into a 2-l, 4-neck resin kettle, fitted with a stainless steel anchor agitator, a nitrogen purge dip tube, an adapter and a reflux condenser, add 144 g of N-vinylcaprolactam, 96 g of methanol and 48 g of water. The mixture was heated to 60° C. and purged nitrogen throughout the experiment. After purging nitrogen for ½ hour, add 0.15 g of initiator t-butylperoxy pivalate (Lupersol 11) to kettle. Start feeding the DMAPMA solution from the syringe pump into the kettle over 4 hours. Two portions of 0.3 g of Lupersol 11 are added at 1-hour and 2-hour time period during feeding. After feeding, the solution is kept at 60° C. and 0.15 g of Lupersol 554 is added. One hour later, another 0.15 g of Lupersol 554 is added. The reaction was kept at 60° C. overnight. Then, 4 boosters of 0.08 g of Lupersol 11 are added 2 hours apart. Wait for 3 hours after the last booster, then cool down the reaction to 35° C. and neutralize with 20.8 g of concentrated (37%) HCL solution.

The polymers of the invention find particular utility as coatings in color inkjet receptive films, as described in the related patent application disclosed above, and in personal care products, e.g. hair and skin care compositions.

What is claimed is:

1. A process of making a homopolymer of vinyl caprolactam (VCL), or a copolymer with dimethylaminopropyl methacrylamide (DMAPMA), optionally including one or more polymerizable monomers (X), in the composition range, by weight, VCL/DMAPMA/X, 99 to 30%, 1–70% and 0–30%, respectively, by suspension polymerization in an aqueous/alcoholic solvent medium, without requiring a protective colloid, which comprises charging vinyl caprolactam in an aqueous/alcoholic solvent mixture, wherein the weight ratio of alcohol to total monomers is $\frac{1}{6}$ to 3, and if present, forming a solution of DMAPMA and optional monomers in water, feeding the solution into the VCL charge at a predetermined rate, periodically adding initiator to the reaction mixture, and polymerizing at about 40° to 130° C., and, if desired, neutralizing the product, to form a polymer product at about 5% to 40% solids.

2. A process according to claim 1 wherein the copolymer of VCL/DMAPMA is prepared.

3. A process according to claim 1 wherein the weight ratio of alcohol/total monomers is 0.8 to 1.2.

4. A process according to claim 1 wherein the alcohol is methanol, ethanol or isopropanol.

5. A process according to claim 2 wherein the feeding time of DMAPMA is 1–6 hours.

6. A process according to claim 1 wherein the polymerization temperature is 50° to 80° C.

7. A process according to claim 1 wherein the % solids is 10% to 20%.

8. A process according to claim 1 wherein the weight ratio of initiator/total monomers is 0.1–10%.

9. A process according to claim 8 wherein said weight ratio is 0.2–5%.

* * * * *